US008373777B2

(12) United States Patent
Sasaki

(10) Patent No.: US 8,373,777 B2
(45) Date of Patent: Feb. 12, 2013

(54) IMAGE PROCESSING APPARATUS AND IMAGE PROCESSING METHOD

(75) Inventor: Hiroshi Sasaki, Hachioji (JP)

(73) Assignee: Olympus Corporation, Tokyo (JP)

( * ) Notice: Subject to any disclaimer, the term of this patent is extended or adjusted under 35 U.S.C. 154(b) by 60 days.

(21) Appl. No.: 12/782,828

(22) Filed: May 19, 2010

(65) Prior Publication Data

US 2010/0225790 A1 Sep. 9, 2010

Related U.S. Application Data

(63) Continuation of application No. PCT/JP2008/070673, filed on Nov. 13, 2008.

(30) Foreign Application Priority Data

Nov. 21, 2007 (JP) ................................ 2007-302099

(51) Int. Cl.
H04N 5/217 (2011.01)
H04N 5/228 (2006.01)
H04N 9/64 (2006.01)
G06K 9/40 (2006.01)

(52) U.S. Cl. ................ 348/241; 348/208.4; 348/208.13; 348/222.1; 348/248; 382/254; 382/260; 382/264; 382/275

(58) Field of Classification Search ............ 348/208.99, 348/208.1, 208.4, 208.6, 208.13, 222.1, 241, 348/248; 382/103, 107, 254–255, 260–264, 382/275

See application file for complete search history.

(56) References Cited

U.S. PATENT DOCUMENTS

| 2004/0257454 | A1* | 12/2004 | Pinto et al. ................. 348/222.1 |
|---|---|---|---|
| 2005/0105627 | A1 | 5/2005 | Sun et al. |
| 2005/0168651 | A1* | 8/2005 | Morino ......................... 348/700 |
| 2006/0153472 | A1* | 7/2006 | Sakata et al. .................. 382/255 |
| 2007/0229709 | A1* | 10/2007 | Asamura et al. .............. 348/607 |
| 2008/0079827 | A1* | 4/2008 | Hoshino et al. ............... 348/248 |
| 2008/0123985 | A1* | 5/2008 | Fujibayashi et al. .......... 382/254 |
| 2009/0073277 | A1* | 3/2009 | Numata et al. ............. 348/222.1 |
| 2009/0202164 | A1* | 8/2009 | Rossato et al. ................ 382/238 |
| 2009/0219417 | A1* | 9/2009 | Tsuruoka ...................... 348/241 |

FOREIGN PATENT DOCUMENTS

| JP | 02-184176 A | 7/1990 |
|---|---|---|
| JP | 06-062283 | * 3/1994 |
| JP | 06-062283 A | 3/1994 |

(Continued)

OTHER PUBLICATIONS

Chinese Office Action dated Nov. 30, 2011 issued in counterpart Chinese Application No. 200880117358.5.

Primary Examiner — Jason Chan
Assistant Examiner — Michael Osinski
(74) Attorney, Agent, or Firm — Holtz, Holtz, Goodman & Chick, PC

(57) ABSTRACT

An image processing apparatus includes a region extracting section that extracts a first predetermined region including a target pixel in a current frame and a second predetermined region including a pixel located at the same position as the target pixel in a previous frame, a motion vector calculating section that calculates a motion vector of the first predetermined region with respect to the previous frame based on part or all of the pixels in the first predetermined region and part of the pixels in the second predetermined region, a filter coefficient determining section that determines a filter coefficient for a plurality of pixels in the second predetermined region based on the motion vector, and a noise reducing section that reduces noise in the target pixel based on the plurality of pixels in the second predetermined region and the filter coefficient.

12 Claims, 10 Drawing Sheets

FOREIGN PATENT DOCUMENTS

| | | |
|---|---|---|
| JP | 06-350879 A | 12/1994 |
| JP | 10-013718 A | 1/1998 |
| JP | 2001-136416 A | 5/2001 |
| JP | 2006-222982 A | 8/2006 |
| JP | 2007-243627 A | 9/2007 |

* cited by examiner

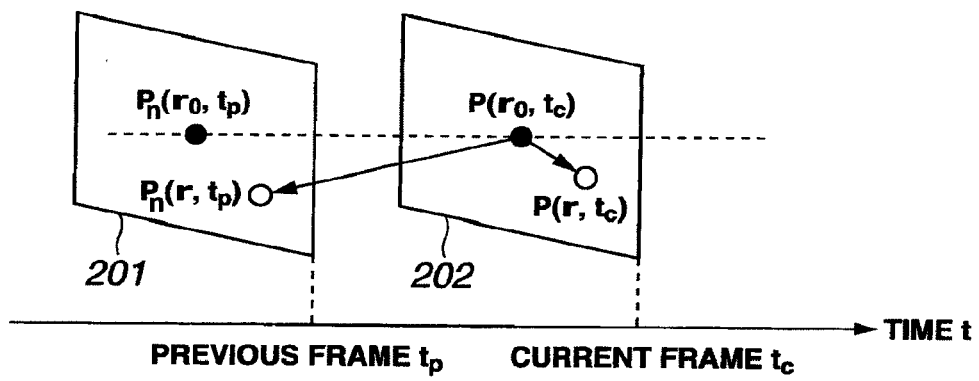

FIG.8
| 4 | 3 | 3 | 3 | 4 |
|---|---|---|---|---|
| 3 | 2 | 2 | 2 | 3 |
| 3 | 2 | 2 | 2 | 3 |
| 3 | 2 | 2 | 2 | 3 |
| 4 | 3 | 3 | 3 | 4 |
FIG.9
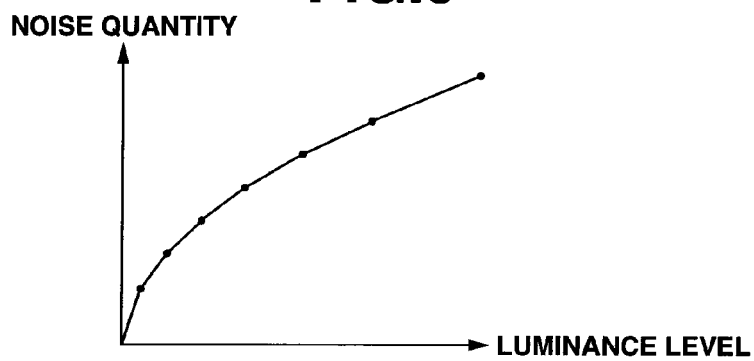
FIG.10
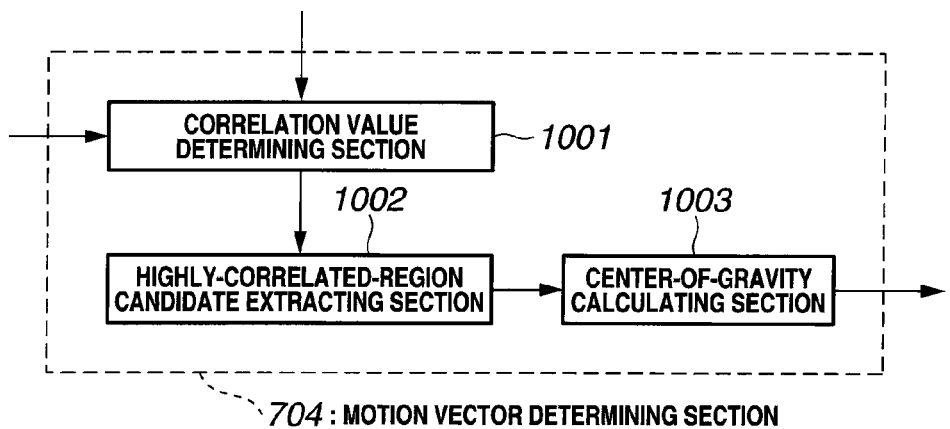
FIG.11
| $E_{00}$ | $E_{01}$ | $E_{02}$ | $E_{03}$ | $E_{04}$ | — 1101 |
|---|---|---|---|---|---|
| $E_{10}$ | $E_{11}$ | $E_{12}$ | $E_{13}$ | $E_{14}$ | |
| $E_{20}$ | $E_{21}$ | $E_{22}$ | $E_{23}$ | $E_{24}$ | |
| $E_{30}$ | $E_{31}$ | $E_{32}$ | $E_{33}$ | $E_{34}$ | |
| $E_{40}$ | $E_{41}$ | $E_{42}$ | $E_{43}$ | $E_{44}$ | |

FIG.12
| $E_{00}$ | $E_{01}$ | $E_{02}$ | $E_{03}$ | $E_{04}$ | — 1201 |
| $E_{10}$ | $E_{11}$ | $E_{12}$ | $E_{13}$ | $E_{14}$ | |
| $E_{20}$ | $E_{21}$ | $E_{22}$ | $E_{23}$ | $E_{24}$ | |
| $E_{30}$ | $E_{31}$ | $E_{32}$ | $E_{33}$ | $E_{34}$ | |
| $E_{40}$ | $E_{41}$ | $E_{42}$ | $E_{43}$ | $E_{44}$ | |
FIG.13
| $E_{00}$ | $E_{01}$ | $E_{02}$ | $E_{03}$ | $E_{04}$ | — 1301 |
| $E_{10}$ | $E_{11}$ | $E_{12}$ | $E_{13}$ | $E_{14}$ | |
| $E_{20}$ | $E_{21}$ | $E_{22}$ | $E_{23}$ | $E_{24}$ | |
| $E_{30}$ | $E_{31}$ | $E_{32}$ | $E_{33}$ | $E_{34}$ | |
| $E_{40}$ | $E_{41}$ | $E_{42}$ | $E_{43}$ | $E_{44}$ | |
FIG.14
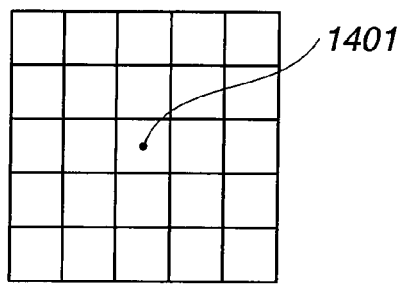
FIG.15
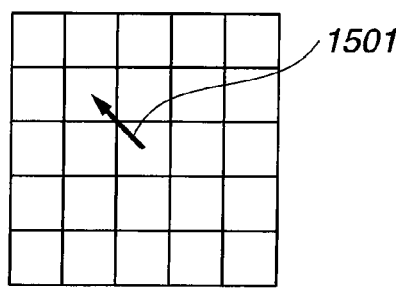

1601

| 18 | 27 | 30 | 27 | 18 | 1701
|----|----|----|----|----|
| 27 | 39 | 44 | 39 | 27 |
| 30 | 44 | 50 | 44 | 30 |
| 27 | 39 | 44 | 39 | 27 |
| 18 | 27 | 30 | 27 | 18 |

| 39 | 44 | 39 | 27 | 14 | 1801
|----|----|----|----|----|
| 44 | 50 | 44 | 30 | 16 |
| 39 | 44 | 39 | 27 | 14 |
| 27 | 30 | 27 | 18 | 10 |
| 14 | 16 | 14 | 10 | 5  |

| 7 | 16 | 30 | 44 | 50 | 1901
|---|----|----|----|----|
| 6 | 14 | 27 | 39 | 44 |
| 4 | 10 | 18 | 27 | 30 |
| 2 | 5  | 10 | 14 | 16 |
| 1 | 2  | 4  | 6  | 7  |

IMAGE PROCESSING APPARATUS AND IMAGE PROCESSING METHOD

CROSS REFERENCE TO RELATED APPLICATION

This application is a continuation application of PCT/JP2008/070673 filed on Nov. 13, 2008 and claims the benefit of Japanese Application No. 2007-302099 filed in Japan on Nov. 21, 2007, the entire contents of which are incorporated herein by this reference.

BACKGROUND OF THE INVENTION

1. Field of the Invention

The present invention relates to an image processing apparatus and an image processing method that reduce noise in sequentially inputted images.

2. Description of the Related Art

Video signals represent a plurality of frame (field) images picked up in a specified time period. In general, the video signals are supposed to represent a correlation within a local space of the frame (Field) by each frame (field) image and represent a correlation within a local time between frames (fields) by adjacent frame (field) images.

Video signals can be obtained by picking up an image of a subject with a video camera provided with an image pickup device, such as a CCD and a CMOS. For example, a digital video camera obtains digital video signals as follows. First, a lens of an image pickup section of the video camera forms an optical subject image on an image pickup device. The formed optical subject image is photoelectrically converted into an electrical signal for each pixel on the image pickup device. The electrical signals are outputted from the image pickup device in a predetermined order. The signals outputted from the image pickup device are analog image signals. The analog image signals are amplified with a predetermined gain and then converted into digital image signals by an A/D converting section. Then, in general, a digital signal processing circuit performs a predetermined image processing on the digital image signals thus obtained.

In general, noise is superimposed on the image picked up by the video camera. The noise has many causes, one of which is characteristics of the image pickup device. A representative one of the noise caused by the characteristics of the image pickup device is shot noise that is caused by a statistical characteristics involved in photoelectric conversion. The shot noise has an average amplitude proportional to the square root of the image signal value and, in general, is temporally and spatially statistically random.

Although the random noise is literally "random", the video signals have a local spatial correlation and a local temporal correlation as described above. Thus, to reduce the random noise superimposed on the video signals, an intra-frame (intra-field) noise reduction processing based on the spatial correlation and an inter-frame (inter-field) noise reduction processing based on the temporal correlation can be used. Various types of noise reduction processing techniques that can be applied to the video signals have been already proposed.

Unless otherwise specified, one picked up image will be referred to as a frame in the following description. And the present invention can be equally applied even if the term "frame" is replaced with the term "field" in the following description.

Of the two types of noise reduction processings described above, the type of noise reduction processing based on the temporal correlation includes a recursive noise reduction processing that uses a frame reduced in noise as a previous frame. The recursive noise reduction processing is known as a technique that can more effectively reduce noise than many other noise reduction processings.

For example, Japanese Patent Application Laid-Open Publication No. 2-184176 describes a technique which achieves noise reduction by detecting a variation of a video for each screen section, calculating a motion signal proportional to the variation, and mixing the current video signal, at a predetermined ratio, with a signal that is selectively weighted with either a weight applied to a video signal of the previous frame or a weight applied to a video signal in the previous line of the current frame depending on the motion signal.

Further, a noise reduction technique that uses both the intra-frame correlation and the inter-frame correlation to improve noise reduction for a dynamic scene is described in Japanese Patent Application Laid-Open Publication No. 6-62283, for example. A noise reduction system described in the publication has an image memory to provide a delay of one frame or one field. The noise reduction system outputs pixel data reduced in noise by performing a nonlinear filtering processing on center pixel data about a center pixel and nearby pixel data about a pixel close to the center pixel that are newly inputted thereto and nearby pixel data about a pixel close to the center pixel in image data for the previous frame or field already reduced in noise and recorded in the image memory. The nonlinear filter is designed to take a weighted average by assigning a high weighting factor to nearby pixel data having a high correlation with the center pixel data value and a low weighting factor to a pixel having a low correlation. Thus, noise can be reduced by using both the intra-frame correlation and the inter-frame correlation. In particular, when the picked up image is static, the technique can effectively reduce noise because the pixels in the previous frame or field and pixels in the current field used for the weighted averaging include an increased number of pixels having high weighting factors, and thus an increased number of pixels contribute to the averaging. When the picked up image is dynamic, pixels in the current field have higher weighting factors than pixels in the previous frame or field, so that the effect of the pixels in the current frame is predominant in the weighted averaging, and thus, the amount of noise reduced decreases compared with the case of the static image. However, the noise reduction effect is still higher than the simple recursive noise reduction processing based on the pixels at the same position in the current frame and the previous frame.

In Japanese Patent Application Laid-Open Publication No. 6-350879, another noise reduction technique is described. The technique performs an inter-frame noise reduction processing by calculating a correlation between a predetermined block in the current frame and blocks of image signals in the previous frame by block matching, extracting a block determined as having the highest correlation from the previous frame, and performing a noise reduction processing on the extracted block and the predetermined block in the current frame. The technique can effectively reduce noise even in a dynamic image by taking advantage of the inter-frame correlation.

As described above, the conventional noise reduction processings using the temporal correlation involve switching to a noise reduction processing mainly using the intra-frame correlation for a dynamic region or actively using the inter-frame correlation by calculating a motion vector and extracting a region having a high inter-frame correlation.

SUMMARY OF THE INVENTION

An image processing apparatus according to an aspect of the present invention is an image processing apparatus that performs a noise reduction processing on images inputted sequentially, including: a pixel extracting section of extracting a plurality of pixels in a first predetermined region including a target pixel in a processing target image and a plurality of pixels in a second predetermined region including a pixel located at the same spatial position as the target pixel in an image previous to the processing target image; a motion vector calculating section of calculating a motion vector of the first predetermined region with respect to the previous image based on part or all of the pixels in the first predetermined region and part of the pixels in the second predetermined region; a filter coefficient determining section of determining a filter coefficient for the plurality of pixels in the second predetermined region based on the motion vector; and a noise reducing section of reducing noise in the target pixel based on the plurality of pixels in the second predetermined region and the filter coefficient.

Furthermore, an image processing method according to another aspect of the present invention is an image processing method that performs a noise reduction processing on images inputted sequentially, including: a pixel extracting step of extracting a plurality of pixels in a first predetermined region including a target pixel in a processing target image and a plurality of pixels in a second predetermined region including a pixel located at the same spatial position as the target pixel in an image previous to the processing target image; a motion vector calculating step of calculating a motion vector of the first predetermined region with respect to the previous image based on part or all of the pixels in the first predetermined region and part of the pixels in the second predetermined region; a filter coefficient determining step of determining a filter coefficient for the plurality of pixels in the second predetermined region based on the motion vector; and a noise reducing step of reducing noise in the target pixel based on the plurality of pixels in the second predetermined region and the filter coefficient.

BRIEF DESCRIPTION OF THE DRAWINGS

FIG. 2 is a schematic diagram showing a positional relationship between pixels in a current frame and pixels in a previous frame according to the embodiment 1;

FIG. 3 is a diagram showing an extraction block region (including 5 by 5 pixels) for a processing target pixel in the current frame according to the embodiment 1;

FIG. 4 is a diagram showing an extraction block region (including 5 by 5 pixels) for a pixel in the previous frame located at the same spatial position as the processing target pixel according to the embodiment 1;

FIG. 5 is a diagram showing a difference value block (including 5 by 5 pixels) of the current frame according to the embodiment 1;

FIG. 8 is a diagram showing an example of arrangement of a weight W(k) by which a result of block matching in motion vector calculation is multiplied according to the embodiment 1;

FIG. 9 is a graph showing a relationship between a quantity of noise included in an image signal and a luminance level according to the embodiment 1;

FIG. 10 is a block diagram showing a detailed configuration of a motion vector determining section according to the embodiment 1;

FIG. 11 shows a 5 by 5 pixel region in a case where a correlation value determining section determines that a center 3 by 3 pixel region has a high correlation according to the embodiment 1;

FIG. 12 shows a 5 by 5 pixel region in a case where the correlation value determining section determines that pixels $E_{10}$ and $E_{12}$ located at upper left positions have a high correlation according to the embodiment 1;

FIG. 13 shows a 5 by 5 pixel region in a case where the correlation value determining section determines that pixels $E_{03}$, $E_{04}$ and $E_{14}$ at an upper right corner have a high correlation according to the embodiment 1;

FIG. 14 is a diagram showing a motion vector v calculated for a binary correlation value E(k) shown in FIG. 11 according to the embodiment 1;

FIG. 15 is a diagram showing a motion vector v calculated for the binary correlation value E(k) shown in FIG. 12 according to the embodiment 1;

DETAILED DESCRIPTION OF THE PREFERRED EMBODIMENT(S)

In the following, embodiments of the present invention will be described with reference to the drawings.

Embodiment 1

Figure 1:
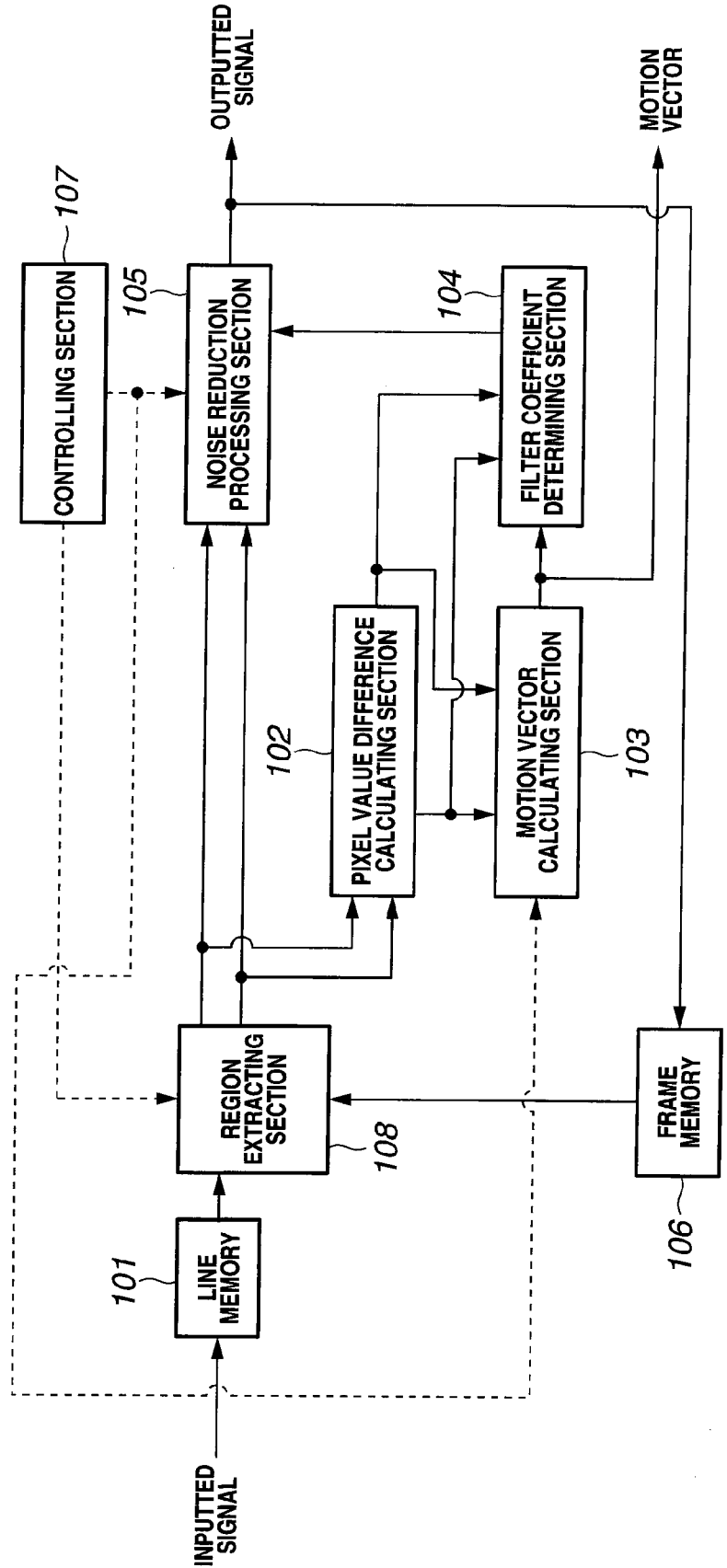
FIG. 1 is a block diagram showing a configuration of an image processing apparatus according to an embodiment 1 of the present invention.

FIGS. 1 to 24 show an embodiment 1 of the present invention. FIG. 1 is a block diagram showing a configuration of an image processing apparatus, and FIG. 2 is a schematic diagram showing a positional relationship between pixels in a current frame and pixels in a previous frame.

Before starting specific description, definitions of expressions used in the present embodiment will be described with reference to FIG. 2.

First, reference character t represents time. Reference character r represents a spatial position in an image. Considering that an image is two-dimensional, a spatial position r is preferably represented by a bold-faced character in conformity to the vector notation, for example. However, in the following description, a normal character r is used as a substitute for the bold-faced character.

A processing target pixel that is to be processed to reduce noise in a current frame that is a processing target image is represented by $P(r_0, t_c)$. A pixel included in an extraction block region (a first predetermined region) 202 of the current frame, which is composed of the processing target pixel $P(r_0, t_c)$ and a neighbor pixel located in a spatial vicinity of the processing target pixel $P(r_0, t_c)$, is represented by $P(r, t_c)$.

A pixel included in an extraction block region (a second predetermined region) for a previous frame reduced in noise is represented by $P_n(r, t_p)$ (Note that a subscript n of P indicates that the pixel has already been processed to reduce noise. A pixel located at the same spatial position $r_0$ as the processing target pixel $P(r_0, t_c)$ is represented by $P_n(r_0, t_p)$). (Note that FIG. 2 shows an extraction block region 201 in the previous frame yet to be reduced in noise. The extraction block region 201 is extracted to include a pixel $P_n(r_0, t_p)$ located at the same spatial position $r_0$ as the processing target pixel $P(r_0, t_c)$ described above. Although the extraction block region 201 has the same size as the extraction block region 202 here, the extraction blocks may have different sizes as described later.)

A difference between a pixel $P(r, t_c)$ in the extraction block region of the current frame and the processing target pixel $P(r_0, t_c)$ is represented by $D(r, t_c)$ and defined as follows.

$$D(r, t_c) = P(r, t_c) - P(r_0, t_c)$$

In particular, the difference D for $r=r_0$ is defined as follows.

$$D(r_0, t_c) = P(r_0, t_c)$$

A difference between the pixel $P_n(r, t_p)$ in the extraction block region of the previous frame and the processing target pixel $P(r_0, t_c)$ is represented by $D(r, t_p)$ and defined as follows.

$$D(r, t_p) = P_n(r, t_p) - P(r_0, t_c)$$

A filter coefficient of noise reduction filtering of the pixel $P(r, t_c)$ in the extraction block region of the current frame is represented by $C(r, t_c)$, and a filter coefficient of noise reduction filtering of the pixel $P_n(r, t_p)$ in the extraction block region of the previous frame is represented by $C(r, t_c)$. Then, a processing target pixel $P_r(r_0, t_c)$ having been subject to noise reduction filtering is calculated as follows.

$$P_r(r_0, t_c) = \Sigma_r C(r, t_c) P(r, t_c) + \Sigma_r C(r, t_p) P_n(r, t_p)$$

The symbol $\Sigma_r$ means a total sum for the extraction region. The filter coefficients of noise reduction $C(r, t_c)$ and $C(r, t_p)$ described above satisfy the following normalization condition.

$$\Sigma_r \{C(r, t_c) + C(r, t_p)\} = 1$$

Figures 6, 7:
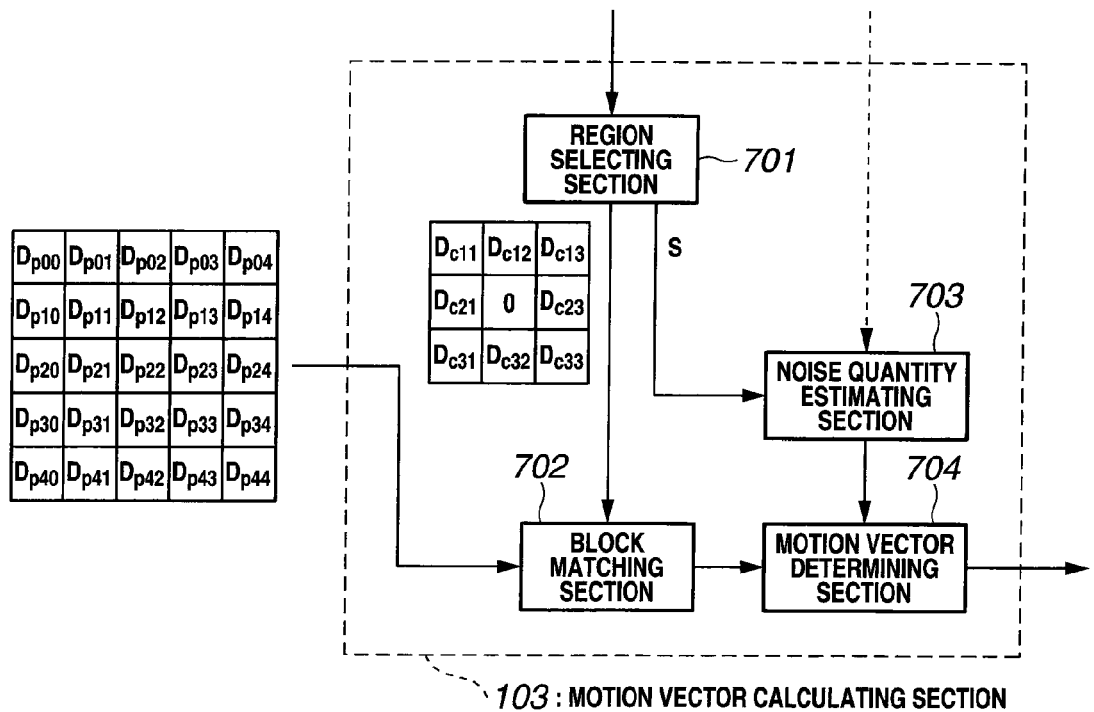
FIG. 6 is a diagram showing a difference value block (including 5 by 5 pixels) of the previous frame according to the embodiment 1.
FIG. 7 is a block diagram showing a detailed configuration of a motion vector calculating section according to the embodiment 1.

FIGS. 3 to 6 show two-dimensional arrays of 5 by 5 elements $P_c$, $P_p$, $D_c$ and $D_p$ that represent the pixels $P(r, t_c)$ and $P_n(r, t_p)$ and the differences $D(r, t_c)$ and $D(r, t_p)$ described above, respectively. Specifically, FIG. 3 is a diagram showing an extraction block region (including 5 by 5 pixels) for the processing target pixel in the current frame, FIG. 4 is a diagram showing an extraction block region (including 5 by 5 pixels) for the pixel in the previous frame located at the same spatial position as the processing target pixel, FIG. 5 is a diagram showing a difference value block (including 5 by 5 pixels) of the current frame, and FIG. 6 is a diagram showing a difference value block (including 5 by 5 pixels) of the previous frame.

In other words, a pixel $P(r, t_c)$ corresponds to an array element 301 represented by $P_{c00}$ to $P_{c44}$ in FIG. 3, a pixel $P_n(r, t_p)$ corresponds to an array element 401 represented by $P_{p00}$ to $P_{p44}$ in FIG. 4, a difference $D(r, t_c)$ corresponds to an array element 501 represented by $D_{c00}$ to $D_{c44}$ in FIG. 5, and a difference $D(r, t_p)$ corresponds to an array element 601 represented by $D_{p00}$ to $D_{p44}$ in FIG. 6. The spatial position $r_0$ of the processing target pixel corresponds to elements $P_{c22}$, $P_{p22}$, $D_{c22}$ and $D_{p22}$ located at the center of the respective arrays. According to the definition of the difference D for $r=r_0$ described above, $D_{c22}$ equals to $P_{c22}$.

Next, referring to FIG. 1, a basic configuration of the image processing apparatus according to the present embodiment will be described.

The image processing apparatus has a line memory 101, a pixel value difference calculating section 102, a motion vector calculating section 103, a filter coefficient determining section 104, a noise reduction processing section 105 serving as a noise reducing section, a frame memory 106, a controlling section 107, and a region extracting section 108 serving as a pixel extracting section.

The line memory 101 receives digital video signals in a raster scan order. For example, a digital video signal is digital data produced by A/D-converting an analog signal produced by photoelectrically converting an optical image formed on an image pickup device through a lens of an image pickup section (not shown).

The line memory 101 is capable of storing a plurality of lines of data. More specifically, the line memory 101 is capable of storing at least a number of lines of data that can cover a processing area to be filtered by the noise reduction processing section 105.

The region extracting section 108 extracts pixels $P(r, t_c)$ in a block region of a predetermined size including the processing target pixel $P(r_0, t_c)$ from the plurality of lines of data stored in the line memory 101 according to a control signal from the controlling section 107, and outputs the extracted pixels $P(r, t_c)$ in the block region to the pixel value difference calculating section 102 and the noise reduction processing section 105.

In addition, the region extracting section 108 extracts pixels $P_n(r, t_p)$ in a predetermined block region including the pixel $P_n(r_0, t_p)$ located at the same pixel position $r_0$ as the processing target pixel $P(r_0, t_c)$ from the outputted image data for the previous frame reduced in noise stored in the frame memory 106 according to a control signal from the controlling section 107, and outputs the extracted pixels $P_n(r, t_p)$ in the block region to the pixel value difference calculating section 102 and the noise reduction processing section 105.

The frame memory 106 is configured as a ring buffer having a capacity capable of storing two frames of image data. That is, the frame memory 106 is configured not to overwrite the pixels $P_n(r, t_p)$ of the previously recorded previous frame image reduced in noise with the pixels $P_n(r, t_c)$ of the newly inputted current frame image reduced in noise.

The pixel value difference calculating section 102 calculates the difference $D(r, t_c)$ based on the inputted pixels $P(r, t_c)$ and the processing target pixel $P(r_0, t_c)$ included therein as described above, and calculates the difference $D(r, t_p)$ based on the inputted pixels $P_n(r, t_p)$ of the previous frame and the processing target pixel $P(r_0, t_c)$ of the current frame as described above. Then, the pixel value difference calculating section 102 outputs the calculated differences $D(r, t_c)$ and $D(r, t_p)$ to the motion vector calculating section 103 and the filter coefficient determining section 104.

The motion vector calculating section 103 calculates a motion vector v (the normal character v used herein is a substitute for the bold-faced character thereof) based on the inputted differences $D(r, t_c)$ and $D(r, t_p)$, and outputs the calculated motion vector v to the filter coefficient determining section 104. The motion vector calculating section 103 is configured to output the calculated motion vector v to another processing section for another processing, such as camera shake correction.

The filter coefficient determining section 104 calculates a filter coefficient $C(r, t_c)$ to be applied to the pixels $P(r, t_c)$ in the extraction block region of the current frame and a filter coefficient $C(r, t_p)$ to be applied to the pixels $P_n(r, t_p)$ in the extraction block region of the previous frame based on the inputted differences $D(r, t_c)$ and $D(r, t_p)$ and the motion vector v, and outputs the calculated filter coefficients $C(r, t_c)$ and $C(r, t_p)$ to the noise reduction processing section 105.

The noise reduction processing section 105 performs a noise reduction processing on the processing target pixel $P(r_0, t_c)$ based on the pixels $P(r, t_c)$ in the predetermined extraction block region of the current frame received from the region extracting section 108, the pixels $P_n(r, t_p)$ in the predetermined extraction block region of the previous frame received from the region extracting section 108, the filter coefficients $C(r, t_c)$ and $C(r, t_p)$ received from the filter coefficient determining section 104, and a noise estimation parameter (such as an ISO sensitivity and a gain as described later) received from the controlling section 107. Then, the noise reduction processing section 105 outputs the processing target pixel $P_n(r_0, t_c)$ reduced in noise to an output buffer (not shown) and the frame memory 106.

FIG. 7 is a block diagram showing a detailed configuration of the motion vector calculating section 103.

The motion vector calculating section 103 has a region selecting section 701, a block matching section 702, a noise quantity estimating section 703, and a motion vector determining section 704.

The difference $D(r, t_c)$ for the extraction block region outputted from the pixel value difference calculating section 102 is inputted to the region selecting section 701 of the motion vector calculating section 103. The region selecting section 701 extracts a center region of the inputted difference $D(r, t_c)$, for example (although the difference D for a part of the extraction block region is extracted in the present example, the difference D for the entire extraction block region may be extracted, in particular when the extraction block region of the previous frame has a larger size than the extraction block region of the current frame). In the example shown in FIG. 7, the motion vector calculating section 103 extracts differences $D_{c11}, D_{c12}, D_{c13}, D_{c21}, D_{c22}, D_{c23}, D_{c31}, D_{c32}$ and $D_{c33}$ corresponding to a 3 by 3 pixel region at the center of the array of 5 by 5 elements 501 shown in FIG. 5. Then, the motion vector calculating section 103 calculates an integration value S for the extraction region as follows.

$$S = \Sigma_r D_x(r, t_c) + P(r_0, t_c)$$

In the equation, a symbol $\Sigma_r$ represents a total sum for the 3 by 3 pixel region extracted by the region selecting section 701. In addition, $D_x(r, t_c)$ represents pixels included in the extracted center 3 by 3 pixel region in which 0 is substituted for the center elements $D_{c22}$ and $P_{c22}$ (that is, a region in which $D_{c22} = P_{c22} = 0$) (FIG. 7 shows the $D_x(r, t_c)$).

The motion vector calculating section 103 transfers the calculated integration value S to the noise quantity estimating section 703 and transfers $D_x(r, t_c)$ to the block matching section 702.

Thus, the block matching section 702 receives the pixels $D_x(r, t_c)$ in the differential data extraction region from the region selecting section 701. The block matching section 702 also receives the differences $D(r, t_p)$ from the pixel difference calculating section 102. The block matching section 702 calculates a correlation value E(k) for the extraction block between the current frame and the previous frame by the following calculation (the normal character k used in the equation is a substitute for the bold-faced character thereof).

$$E(k) = \Sigma_r |D(r+k, t_p) - D_x(r, t_c)| \times W(k)$$

If (r+k) is out of the extraction region $D(r+k, t_p)$ of the previous frame, the addition is not performed. W(k) is a weight intended to prevent the value from becoming too small because of a decrease in number of peripheral pixels used for calculation of the correlation value. FIG. 8 is a diagram showing an example of arrangement of the weight W(k) by which the block matching result is multiplied in the motion vector calculation. FIG. 8 shows an example of the weight for the 5 by 5 pixel region.

In the above description, a sum of absolute values of the differences is used to calculate the correlation value E(k) in order to reduce the calculation amount. However, the present invention is not limited to the implementation. If some increase in calculation amount poses no problem, the correlation value E(k) may be calculated by using a sum of squares, for example, of course.

The block matching section 720 outputs the calculated correlation value E(k) to the motion vector determining section 704.

On the other hand, the noise quantity estimating section 703 receives the noise estimation parameter from the controlling section 107 and receives the integration value S for the extraction region from the region selecting section 701. Based on the noise estimation parameter and the integration value S, the noise quantity estimating section 703 estimates the noise quantity. FIG. 9 is a graph showing a relationship between the quantity of noise included in an image signal (a statistical noise quantity (standard deviation)) and a luminance level. FIG. 9 is a line graph including 7 points (or 8 points including zero) showing a noise model table, which is a noise estimation parameter used for noise quantity estimation.

The noise model table is produced as follows. First, an image pickup apparatus for which a noise model table is to be produced picks up an image of a particular subject. The "particular subject" is a subject including a plurality of patches having different luminance levels, and the luminance level is uniform in each patch. The particular subject may be a gray chart, for example. Then, supposing that an average luminance value for each patch is a luminance level, and a standard deviation for each patch is a noise quantity, the luminance level and the noise quantity are associated with each other to produce the table.

The noise quantity estimating section 703 uses the integration value S for the extraction region as the luminance level and determines two registration luminance levels close to the luminance level, one of which is higher than the luminance level, and the other is lower than the luminance level. Then, the noise quantity estimating section 703 retrieves two standard deviation corresponding to the two registration luminance levels from the noise model table described above. Then, the noise quantity estimating section 703 performs a linear interpolation of the two standard deviation based on the two registration luminance levels and the luminance level of the integration value S, thereby calculating the noise quantity $N_{q0}$ for the luminance level of the integration value S. Furthermore, the noise quantity estimating section 703 corrects the calculated noise quantity $N_{q0}$ based on an image pickup condition (a parameter such as an ISO sensitivity and a gain) received from the controlling section 107, which is one of the noise estimation parameters, thereby calculating a final estimated noise quantity $N_q$. For example, the final estimated noise quantity $N_q$ is calculated as follows.

$$N_q = N_{q0} \times F(\text{gain}, \ldots)$$

In the equation, $F(x, \ldots)$ represents a function that has one or more variables.

Then, the noise quantity estimating section 703 outputs the calculated estimated noise quantity $N_q$ to the motion vector determining section 704.

FIG. 10 is a block diagram showing a detailed configuration of the motion vector determining section 704.

The motion vector determining section 704 has a correlation value determining section 1001, a highly-correlated-region candidate extracting section 1002, and a center-of-gravity calculating section 1003.

The estimated noise quantity $N_q$ and the correlation value $E(k)$ are inputted to the correlation value determining section 1001 in the motion vector determining section 704. Then, the correlation value determining section 1001 compares the estimated noise quantity $N_q$ and the correlation value $E(k)$. However, since the inputted estimated noise quantity $N_q$ is a value for one pixel, the correlation value determining section 1001 multiplies the estimated noise quantity $N_q$ by a predetermined coefficient to scale the estimated noise quantity $N_q$ up to the correlation value $E(k)$ before the comparison described above.

If the correlation value determining section 1001 determines that the correlation value $E(k)$ is larger than the estimated noise quantity $N_q$, the correlation value determining section 1001 determines that the region has a low correlation and outputs a value 0. Otherwise, the correlation value determining section 1001 determines that the region can have a high correlation even though the correlation is obscured by noise and outputs a value 1.

FIGS. 11 to 13 shows examples of the result of determination of the correlation value $E(k)$ for a 5 by 5 pixel region. FIG. 11 shows a 5 by 5 pixel region in the case where the correlation value determining section 1001 determines that a center 3 by 3 pixel region has a high correlation. FIG. 12 shows a 5 by 5 pixel region in the case where the correlation value determining section 1001 determines that pixels $E_{10}$ and $E_{12}$ located at upper left positions have a high correlation. FIG. 13 shows a 5 by 5 pixel region in the case where the correlation value determining section 1001 determines that pixels $E_{03}$, $E_{04}$ and $E_{14}$ at the upper right corner have a high correlation. In FIGS. 11 to 13, the hatched areas are determined to be likely to have a high correlation and set at the value 1, and the remaining areas are determined to be likely to have a low correlation and set at the value 0.

More specifically, in the example shown by reference numeral 1101 in FIG. 11, the center 3 by 3 pixel region is determined to have a high correlation and set at the value 1, and the other region is determined to have a low correlation and set at the value 0.

In the example shown by reference numeral 1201 in FIG. 12, the pixels $E_{10}$ and $E_{12}$ are determined to have a high correlation and set at the value 1, and the other region is determined to have a low correlation and set at the value 0.

Similarly, in the example shown by reference numeral 1301 in FIG. 13, the pixels $E_{03}$, $E_{04}$ and $E_{14}$ are determined to have a high correlation and set at the value 1, and the other region is determined to have a low correlation and set at the value 0.

The correlation value determining section 1001 outputs the resulting binary correlation value $E(k)$ to the highly-correlated-region candidate extracting section 1002.

The highly-correlated-region candidate extracting section 1002 calculates a position vector $k_e$ for the center position $E_{22}$ in the region for which the inputted binary correlation value $E(k)$ is 1, and outputs the calculated position vector $k_e$ to the center-of-gravity calculating section 1003.

The center-of-gravity calculating section 1003 calculates a motion vector v according to the following equation and outputs the calculated motion vector v to the filter coefficient determining section 104.

$$v = \Sigma k_e / N_e$$

In the equation, $N_e$ represents the number of position vectors outputted from the highly-correlated-region candidate extracting section 1002.

If the inputted binary correlation values $E(k)$ are vertically and horizontally symmetrical with respect to the center position $E_{22}$ as shown in FIG. 11, for example, the motion vector v calculated by the center-of-gravity calculating section 1003 is a zero vector as shown by reference numeral 1401 in FIG. 14. FIG. 14 is a diagram showing the motion vector v calculated for the binary correlation value $E(k)$ shown in FIG. 11.

If the inputted binary correlation values $E(k)$ are biased to the upper left with respect to the center position $E_{22}$ as shown in FIG. 12, for example, the motion vector v calculated by the center-of-gravity calculating section 1003 is a vector shown by reference numeral 1501 in FIG. 15. FIG. 15 is a diagram showing the motion vector v calculated for the binary correlation value $E(k)$ shown in FIG. 12.

Figures 16, 17, 18, 19:
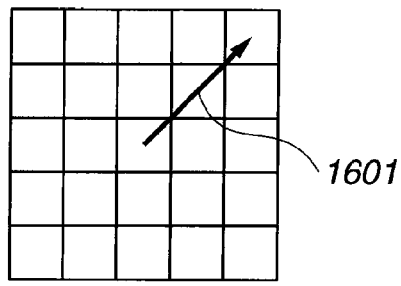
FIG. 16 is a diagram showing a motion vector v calculated for the binary correlation value E(k) shown in FIG. 13 according to the embodiment 1.
FIG. 17 is a diagram showing an example of spatial distance filter coefficients determined for the motion vector shown in FIG. 14 according to the embodiment 1.
FIG. 18 is a diagram showing an example of spatial distance filter coefficients determined for the motion vector shown in FIG. 15 according to the embodiment 1.
FIG. 19 is a diagram showing an example of spatial distance filter coefficients determined for the motion vector shown in FIG. 16 according to the embodiment 1.

Furthermore, if the inputted binary correlation values $E(k)$ are biased toward the upper right corner with respect to the center position $E_{22}$ as shown in FIG. 13, for example, the motion vector v calculated by the center-of-gravity calculating section 1003 is a vector shown by reference numeral 1601 in FIG. 16. FIG. 16 is a diagram showing the motion vector v calculated for the binary correlation value $E(k)$ shown in FIG. 13.

Figure 20:
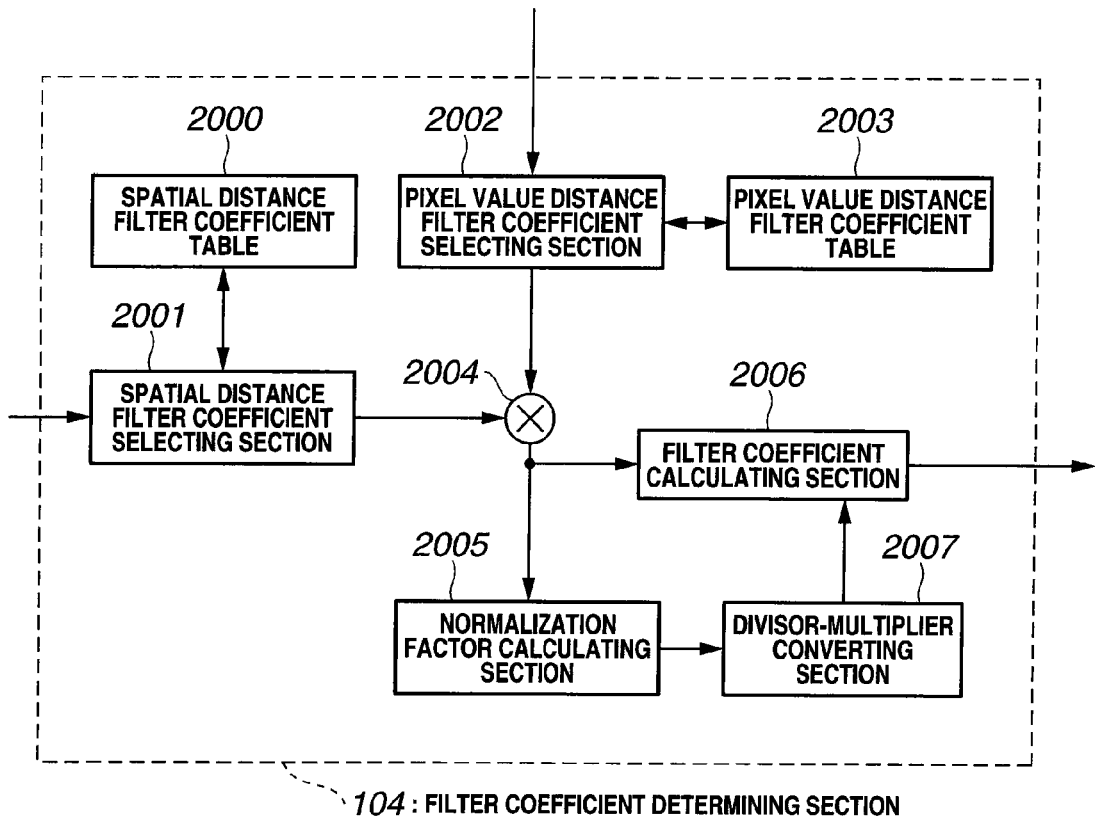
FIG. 20 is a block diagram showing a detailed configuration of a filter coefficient determining section according to the embodiment 1.

FIG. 20 is a block diagram showing a detailed configuration of the filter coefficient determining section 104.

The filter coefficient determining section 104 has a spatial distance filter coefficient table 2000, a spatial distance filter coefficient selecting section 2001 that serves as a maximum weight position determining section and a spatial distance weighting factor determining section, a pixel value distance filter coefficient selecting section 2002 that serves as a pixel value distance weighting factor determining section, a pixel value distance filter coefficient table 2003, a multiplier 2004 that forms a filter coefficient calculating element, a normalization factor calculating section 2005 that forms the filter coefficient calculating element, a filter coefficient calculating section 2006 that forms the filter coefficient calculating element, and a divisor-multiplier converting section 2007 that forms the filter coefficient calculating element.

The filter coefficient determining section 104 receives the differences $D(r, t_c)$ and $D(r, t_p)$ outputted from the pixel value difference calculating section 102 and the motion vector v outputted from the motion vector calculating section 103. Of these inputs, the differences $D(r, t_c)$ and $D(r, t_p)$ are inputted to the pixel value distance filter coefficient selecting section 2002, and the motion vector v is inputted to the spatial distance filter coefficient selecting section 2001.

Figure 21:
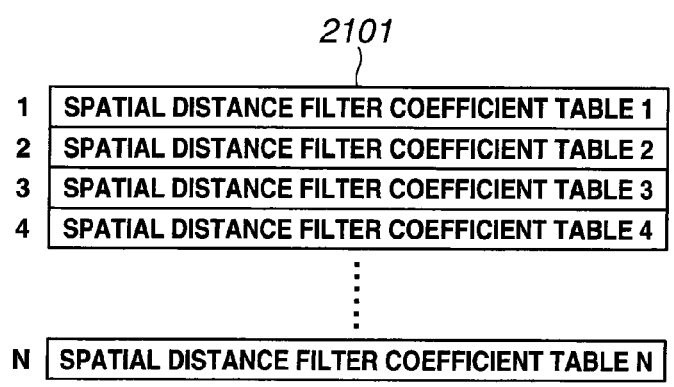
FIG. 21 is a diagram showing spatial distance filter coefficient tables according to the embodiment 1.

The spatial distance filter coefficient selecting section 2001 converts two-dimensional coordinates of the inputted motion vector v into a serial number n in the order of raster scan from upper left to lower right. Then, the spatial distance filter coefficient selecting section 2001 selects and reads in a table indexed with the serial number n from among coefficient tables with indices 1 to N shown by reference numeral 2101 in FIG. 21 stored in the spatial distance filter coefficient table 2000. FIG. 21 is a diagram showing spatial distance filter coefficient tables. Each indexed table contains coefficient values for a filter size (5 by 5 pixels, for example).

In the case where the motion vector v has a precision of the pixel pitch, the total number N of indices equals to the number of pixels in the motion vector calculation region. In the case where the motion vector v has a precision of half the pixel pitch, the total number N of indices is four times as large as the number of pixels in the motion vector calculation region.

FIGS. 17 to 19 show examples of filter coefficient values for selected 5 by 5 pixels, for example. FIG. 17 is a diagram showing an example of spatial distance filter coefficients determined for the motion vector shown in FIG. 14. FIG. 18 is a diagram showing an example of spatial distance filter coefficients determined for the motion vector shown in FIG. 15. FIG. 19 is a diagram showing an example of spatial distance filter coefficients determined for the motion vector shown in FIG. 16.

If the motion vector is the vector 1401 shown in FIG. 14, filter coefficients are determined as shown by reference numeral 1701 in FIG. 17. The filter coefficients shown by reference numeral 1701 are also available for a spatial distance filter for the difference $D(r, t_c)$ for the extraction block of the current frame.

If the motion vector is the vector 1501 shown in FIG. 15, filter coefficients are determined as shown by reference numeral 1801 in FIG. 18.

If the motion vector is the vector 1601 shown in FIG. 16, filter coefficients are determined as shown by reference numeral 1901 in FIG. 19.

The filter coefficient values shown in FIGS. 17 to 19 are shown only to illustrate that the filter coefficient two-dimensionally varies with the motion vector, and the present invention is not limited to the filter coefficient values shown in these drawings.

The filter coefficients shown in FIGS. 17 to 19 are based on a Gaussian function $G_s(r)=A\exp\{-(r-v)^2/2\sigma_s^2\}$. The center position (r=v) of the Gaussian function (the center position is the maximum weight position) corresponds to the hatched positions in FIGS. 17 to 19, and the coefficient value decreases with the spatial distance |r| from the center position. That is, the filter coefficients shown in FIGS. 17 to 19 are the filter coefficients for a kernel size region (a 5 by 5 pixel size region in the examples shown in the drawings) extracted by shifting the Gaussian function as a filter so that the position pointed by the motion vector v becomes the center position.

In the example described above, the filter coefficients are produced by using a Gaussian function. However, the present invention is not limited thereto, and the filter coefficients may be produced by using any function other than the Gaussian function.

The spatial distance filter coefficient selecting section 2001 outputs the spatial distance filter coefficients thus selected to the multiplier 2004.

On the other hand, the pixel value distance filter coefficient selecting section 2002 takes the absolute value of the differences $D(r, t_c)$ and $D(r, t_p)$ inputted from the pixel value difference calculating section 102 as the pixel value distance, selects the filter coefficients corresponding to the pixel value distances from the pixel value distance filter coefficient table 2003, and outputs the selected filter coefficients to the multiplier 2004.

Figure 22:
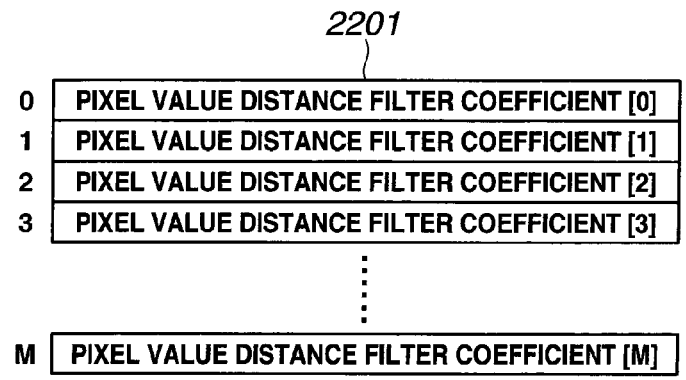
FIG. 22 is a diagram showing a pixel value distance filter coefficient table that contains weighting factor values corresponding to pixel value difference values according to the embodiment 1.

FIG. 22 is a diagram showing a pixel value distance filter coefficient table that contains weighting factor values corresponding to pixel value difference values. A pixel value distance filter coefficient table denoted by reference numeral 2201 has indices 0 to M, which correspond to the range in which the absolute difference values can be taken. The pixel value distance filter coefficient table contains predetermined function values for the inputted pixel value distances (absolute difference values).

The pixel value distance filter may be designed based on a Gaussian function $G_d(d)=B\exp\{-d^2/2\sigma_d^2\}$ as with the spatial distance filter described above or designed based on any other function that decreases as the variable increases (a rational function, for example).

The multiplier 2004 receives the spatial distance filter coefficients from the spatial distance filter coefficient selecting section 2001 and the pixel value distance filter coefficients from the pixel value distance filter coefficient selecting section 2002, and multiplies the spatial distance filter coefficient for each filter coefficient position by the pixel value distance filter coefficient for the same filter coefficient position to form a bilateral filter coefficient value. The bilateral filter coefficient values are outputted to the filter coefficient calculating section 2006 and the normalization factor calculating section 2005. In general, the total sum of the calculated bilateral filter coefficient values in the kernel is not fixed at 1 but varies, so that the filter coefficient calculating section 2006 corrects the filter coefficients to make the total sum of the filter coefficients equal to 1.

To this end, the normalization factor calculating section 2005 first calculates the total sum of the inputted bilateral filter coefficient values corresponding to the extraction blocks of the current frame and the previous frame and outputs the total sum to the divisor-multiplier converting section 2007 as a normalization factor value.

The divisor-multiplier converting section 2007 has a table that converts an input value into an inverse. The divisor-multiplier converting section 2007 converts the inputted normalization factor value into an inverse and outputs the inverse to the filter coefficient calculating section 2006.

The filter coefficient calculating section 2006 multiplies the inputted bilateral filter coefficient values by the inverse of the normalization factor value to determine the filter coefficients $C(r, t_c)$ and $C(r, t_p)$, the total sum of which equals to 1. Then, the filter coefficient calculating section 2006 outputs the determined filter coefficients $C(r, t_c)$ and $C(r, t_p)$ to the noise reduction processing section 105.

In the above description, the filter coefficients are coefficients of a bilateral filter. Alternatively, however, the filter coefficients may be coefficients of a monolateral filter that uses only the spatial distance. In this case, although the quality of preservation of a sharp edge decreases, a fine structure can be adequately preserved.

Figure 23:
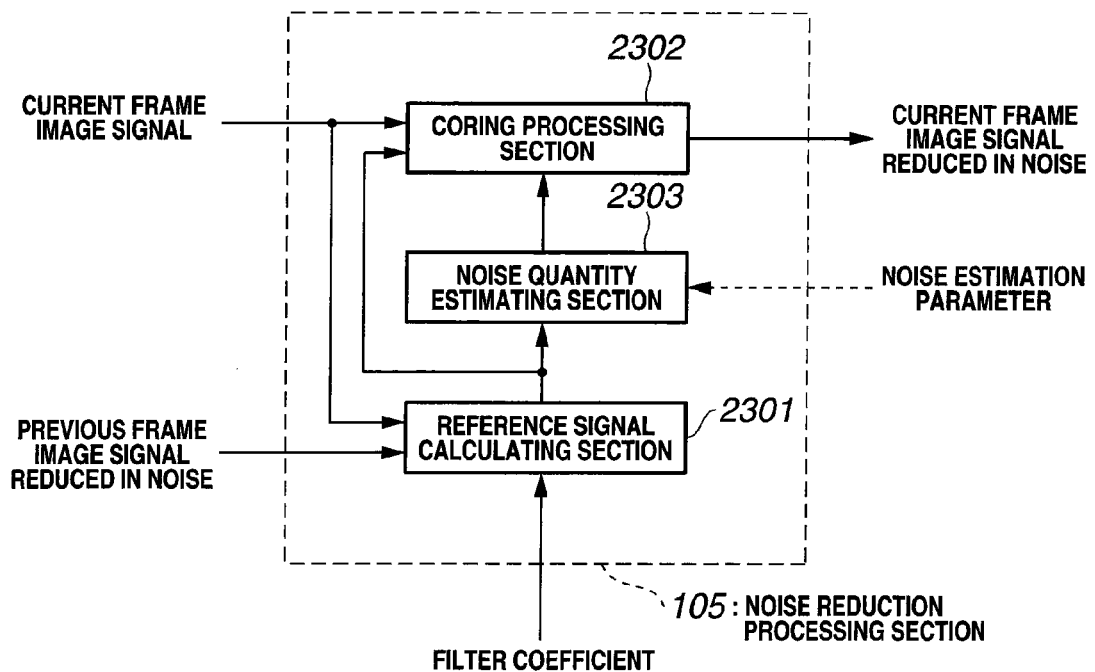
FIG. 23 is a block diagram showing a detailed configuration of a noise reduction processing section according to the embodiment 1.

FIG. 23 is a block diagram showing a detailed configuration of the noise reduction processing section 105.

The noise reduction processing section 105 has a reference signal calculating section 2301, a coring processing section 2302, and a noise quantity estimating section 2303.

The noise reduction processing section 105 receives the pixels $P(r, t_c)$ and $P_n(r, t_p)$ in the extraction block region and the processing target pixel $P(r_0, t_c)$ outputted from the region extracting section 108, the filter coefficients $C(r, t_c)$ and $C(r,$ $t_p$) outputted from the filter coefficient determining section 104, and the noise estimation parameter outputted from the controlling section 107. Of these inputs, the pixels P(r, $t_c$) and $P_n$(r, $t_p$) in the extraction block region and the filter coefficients C(r, $t_c$) and C(r, $t_p$) are inputted to the reference signal calculating section 2301, the processing target pixel P($r_0$, $t_c$) is inputted to the coring processing section 2302, and the noise estimation parameter is inputted to the noise quantity estimating section 2303.

Based on the inputted pixels P(r, $t_c$) and $P_n$(r, $t_p$) and filter coefficients C(r, $t_c$) and C(r, $t_p$), the reference signal calculating section 2301 performs a filtering processing described below, and outputs the processing result to the noise quantity estimating section 2303 and the coring processing section 2302.

$$P_r(r_0,t_c)=\Sigma_r C(r;t_c)P(r;t_c)+\Sigma_r C(r;t_p)P_n(r;t_p)$$

Based on the inputted reference signal $P_r$($r_0$, $t_c$) and the noise estimation parameter described above (an ISO sensitivity, a signal gain, a sensor temperature, an exposure time, or a noise model table), the noise quantity estimating section 2303 estimates the noise quantity, and outputs the estimated noise quantity to the coring processing section 2302. Noise quantity estimation by the noise quantity estimating section 2303 is the same as the noise quantity estimation by the noise quantity estimating section 703 in the motion vector calculating section 103 except that the reference signal $P_r$($r_0$, $t_c$) is used as the luminance level instead of the integration value S for the extraction region, so that description thereof will be omitted.

Based on the inputted reference signal $P_r$($r_0$, $t_c$), the processing target pixel P($r_0$, $t_c$) and the estimated noise quantity $N_q$, the coring processing section 2302 performs a coring processing under the conditions described below to calculate the processing target pixel $P_n$($r_0$, $t_c$) reduced in noise, and outputs the calculated processing target pixel $P_n$($r_0$, $t_c$) reduced in noise to the output buffer (not shown) and the frame memory 106.

When |P($r_0$, $t_c$)−$P_r$($r_0$, $t_c$)|<$N_q$, then $P_n$($r_0$, $t_c$)=$P_r$($r_0$, $t_c$).
When P($r_0$, $t_c$)−$P_r$($r_0$, $t_c$)≧$N_q$, then $P_n$($r_0$, $t_c$)=P($r_0$, $t_0$)−$N_q$.
When P($r_0$, $t_c$)−Pr($r_0$, $t_c$)≦−$N_q$, then $P_n$($r_0$, $t_c$)=P($r_0$, $t_c$)+$N_q$.

Although the noise reduction processing section 105 is configured as shown in FIG. 23 in the present example, the present invention is not limited to the configuration. The noise reduction processing section 105 may have a simpler configuration in which the noise quantity estimating section and the coring processing section shown in FIG. 23 are omitted. In this case, the noise reduction processing is a processing that transforms the reference signal $P_r$($r_0$, $t_c$) into the processing target pixel $P_n$($r_0$, $t_c$) reduced in noise as follows.

$$P_n(r_0,t_c)=P_r(r_0,t_c)$$

Figure 24:
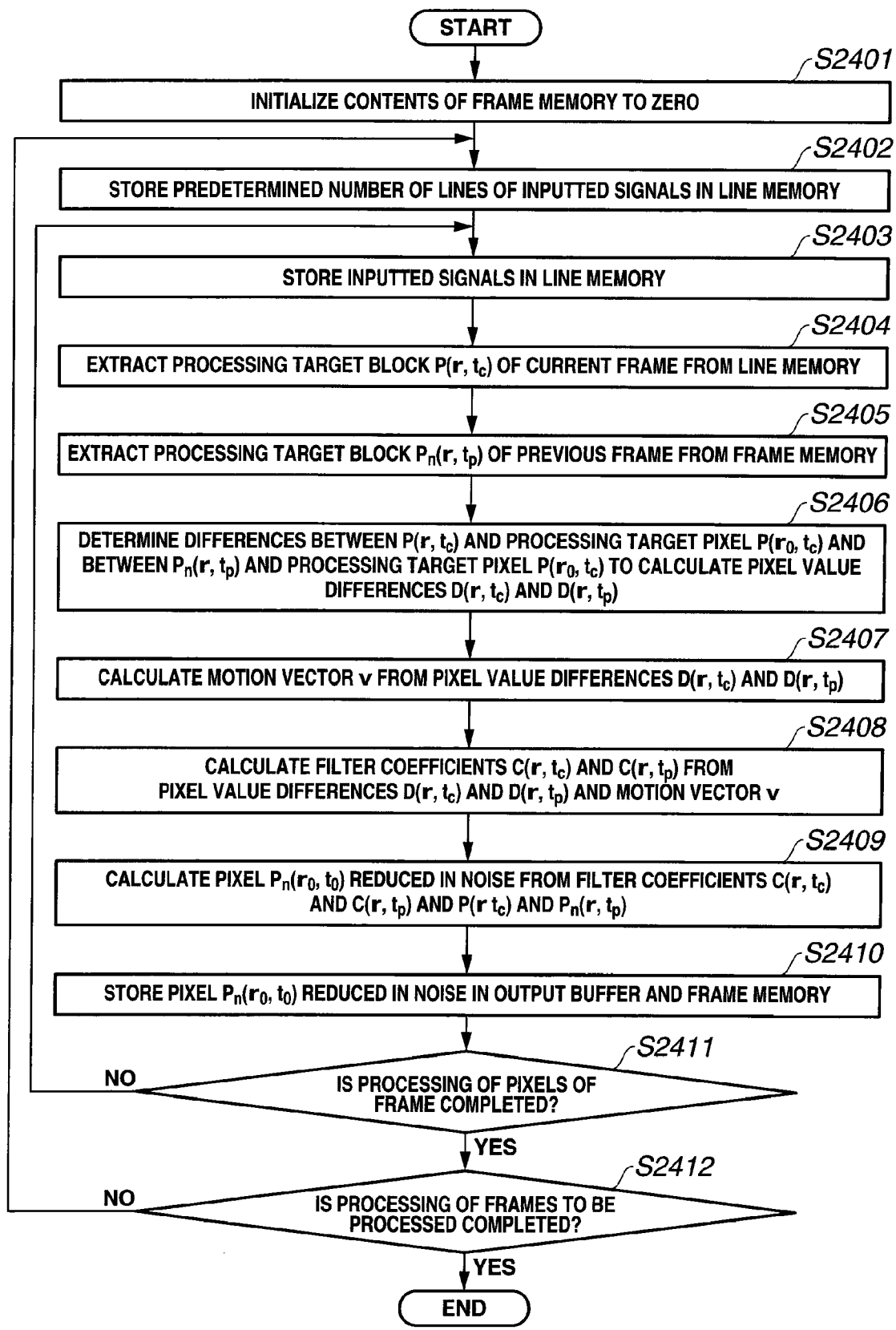
FIG. 24 is a flow chart for illustrating a procedure performed by the image processing apparatus according to the embodiment 1.

FIG. 24 is a flow chart for illustrating a procedure carried out by the image processing apparatus.

At the start of the procedure, the contents of the frame memory 106 are initialized to zero (step S2401).

Then, a predetermined number of lines of image signals inputted in a raster scan order are stored in the line memory 101 (step S2402). For example, in the case where the noise reduction processing section 105 performs the noise reduction processing on an extraction pixel block of 5 by 5 pixels, four lines are stored in step S2402, for example.

Then, if an inputted image signal represents a fifth or lower order pixel from the head of a line (provided that the number of pixels of the extraction pixel block in the horizontal direction is five), inputted signals for five pixels are stored in the line memory 101, or if an inputted image signal represents a sixth or higher order pixel from the head of a line, an inputted signal for one pixel is stored in the line memory 101 (step S2403). Thus, for example, in the case where four lines have been already stored in the line memory 101 in step S2402, five pixels are stored in addition to the four lines in step S2403, and a first extraction block including 5 by 5 pixels can be formed. On the other hand, if four lines and five pixels have been already stored in the line memory 101, a total of four lines and six pixels are stored in the line memory 101 in step S2403, and thus, the extraction pixel block is horizontally shifted by one pixel. In other words, the processing target pixel is horizontally shifted by one pixel.

Then, the region extracting section 108 extracts the pixel P(r, $t_c$) in the processing target block region of the current frame from the line memory 101 (step S2404).

Furthermore, the region extracting section 108 extracts the pixel $P_n$(r, $t_p$) in the processing target block region of the previous frame from the frame memory 106 (step S2405).

Then, the pixel value difference calculating section 102 determines the differences between the pixels P(r, $t_c$) and $P_n$(r, $t_p$) and the processing target pixel P($r_0$, $t_c$), thereby calculating the pixel value differences D(r, $t_c$) and D(r, $t_p$) (step S2406).

Then, the motion vector calculating section 103 calculates the motion vector v from the pixel value differences D(r, $t_c$) and D(r, $t_p$) (step S2407).

Then, the filter coefficient determining section 104 calculates the filter coefficients C(r, $t_c$) and C(r, $t_p$) based on the pixel value differences D(r, $t_c$) and D(r, $t_p$) and the motion vector v (step S2408).

Furthermore, the noise reduction processing section 105 calculates the processing target pixel $P_n$($r_0$, $t_c$) reduced in noise from the filter coefficients C(r, $t_c$) and C(r, $t_p$) and the pixels P(r, $t_c$) and $P_n$(r, $t_p$) (step S2409).

Then, the calculated processing target pixel $P_n$($r_0$, $t_0$) reduced in noise is stored in the output buffer (not shown) and the frame memory (step S2410).

Then, it is determined whether processing of the pixels of the frame is completed or not (step S2411). If it is determined that processing of the pixels of the frame is not completed, the procedure returns to step S2403, and the same processing as described above is repeated.

On the other hand, if it is determined that processing of the pixels of the frame is completed, it is further determined whether processing of a predetermined number of frames to be processed is completed or not (step S2412).

If it is determined that processing of the predetermined number of frames to be processed is not completed, the procedure returns to step S2402, and a next frame is processed as described above.

On the other hand, if it is determined that processing of the predetermined number of frames to be processed is completed, the procedure ends.

According to the embodiment 1 described above, a filter coefficient applied to the extraction block of the previous frame is changed depending on a small fluctuation of the video signal, so that noise can be reduced while preserving a fine structure.

Furthermore, for a large fluctuation of the video signal, a filter coefficient is changed based on the pixel value difference, so that dulling of an edge part can be prevented.

Furthermore, since the noise quantity is estimated, and the motion vector is determined based on the estimated noise quantity, the possibility is reduced that noise causes erroneous detection of a motion vector for an image region including no sharp edge or other remarkable features in spite of the fact that the image region has no temporal correlation.

Embodiment 2

Figure 25:
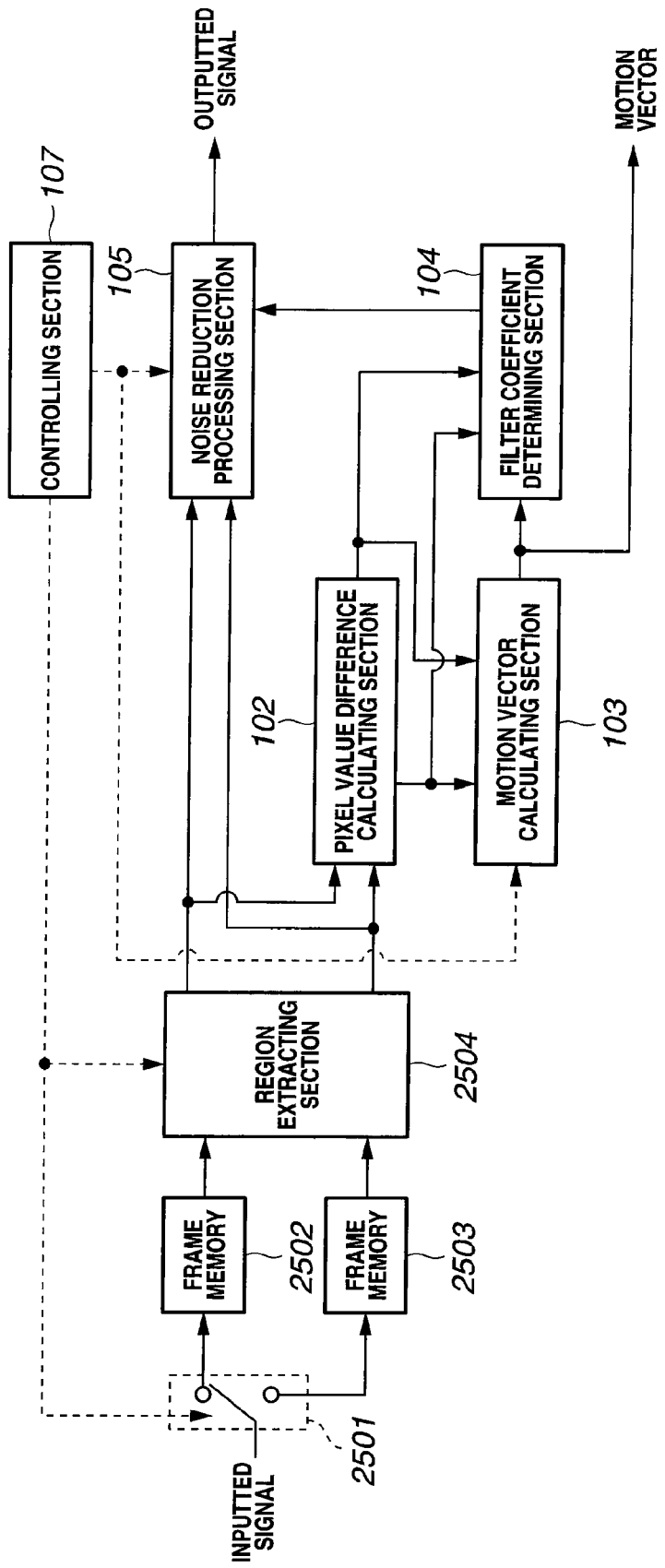
FIG. 25 is a block diagram showing a configuration of an image processing apparatus according to an embodiment 2 of the present invention.

FIG. 25 is a block diagram showing a configuration of an image processing apparatus according to an embodiment 2 of the present invention. With regard to the embodiment 2, the same parts as those in the embodiment 1 described above are denoted by the same reference numerals, and descriptions thereof will be omitted, and the following description will be focused on differences from the embodiment 1.

First, differences between definitions of expressions used in the embodiment 2 and those used in the embodiment 1 described above will be described. According to the embodiment 2, a signal of a previous frame yet to be reduced in noise is used (that is, a recursive noise reduction processing is not used). Since the previous frame is not reduced in noise, an extraction block region of the previous frame is represented by $P(r, t_p)$.

Thus, a difference $D(r, t_p)$ for the extraction block region of the previous frame is defined as follows.

$$D(r,t_p)=P(r,t_p)-P(r_0,t_c)$$

Thus, a processing target pixel $P_r(r_0, t_c)$ having been subjected to a noise reduction filtering processing is defined as follows.

$$P_r(r_0,t_c)=\Sigma_r C(r,t_c)P(r,t_c)+\Sigma_r C(r,t_p)P(r,t_p)$$

As shown in FIG. 25, the image processing apparatus according to the embodiment has a switch 2501, a frame memory 2502, a frame memory 2503, a region extracting section 2504 serving as a pixel extracting section, a pixel value difference calculating section 102, a motion vector calculating section 103, a filter coefficient determining section 104, a noise reduction processing section 105, and a controlling section 107.

The switch 2501 receives digital video signals in a raster scan order, for example. For example, a digital video signal is digital data produced by A/D-converting an analog signal produced by photoelectrically converting an optical image formed on an image pickup device through a lens of an image pickup section (not shown).

The switch 2501 switches the destination of the inputted video image signal between the frame memories 2502 and 2503. Switching of the destination by the switch 2501 is performed for each frame period under the control of the controlling section 107.

The region extracting section 2504 determines which is data about a current frame and which is data about a previous frame in the data stored in the frame memories 2502 and 2503 based on a control signal from the controlling section 107. Based on the determination result, the region extracting section 2504 extracts pixels $P(r, t_c)$ in a block region of a neighboring predetermined size including a processing target pixel $P(r_0, t_c)$ from the data about the current frame, and extracts pixels $P(r, t_p)$ in a predetermined block region from the data about the previous frame. Then, the region extracting section 2504 outputs the pixels $P(r, t_c)$ and $P(r, t_p)$ in the extraction block regions to the pixel value difference calculating section 102 and the noise reduction processing section 105.

The pixel value difference calculating section 102 calculates a difference $D(r, t_c)$ from the inputted pixels $P(r, t_c)$ and $P(r_0, t_c)$ and calculates a difference $D(r, t_p)$ from the inputted pixels $P(r, t_p)$ and $P(r_0, t_c)$. Then, the pixel value difference calculating section 102 outputs the calculated differences $D(r, t_c)$ and $D(r, t_p)$ to the motion vector calculating section 103 and the filter coefficient determining section 104.

The motion vector calculating section 103 calculates a motion vector v from the inputted differences $D(r, t_c)$ and $D(r, t_p)$, and outputs the calculated motion vector v to the filter coefficient determining section 104.

The filter coefficient determining section 104 calculates filter coefficients $C(r, t_c)$ and $C(r, t_p)$ from the inputted differences $D(r, t_c)$ and $D(r, t_p)$ and the motion vector v, and outputs the calculated filter coefficients $C(r, t_c)$ and $C(r, t_p)$ to the noise reduction processing section 105.

The noise reduction processing section 105 performs a noise reduction processing on the processing target pixel $P(r_0, t_c)$ based on the pixels $P(r, t_c)$ in the predetermined extraction block region of the current frame received from the region extracting section 2504, the pixels $P(r, t_p)$ in the predetermined extraction block region of the previous frame received from the region extracting section 2504, the filter coefficients $C(r, t_c)$ and $C(r, t_p)$ received from the filter coefficient determining section 104, and a noise estimation parameter for adjusting the amount of reduction of noise received from the controlling section 107. Then, the noise reduction processing section 105 outputs the processing target pixel $P_n(r_0, t_c)$ reduced in noise to an output buffer (not shown).

According to the embodiment 2 described above, as in the embodiment 1 described earlier, a filter coefficient applied to the extraction block of the previous frame is changed depending on a small fluctuation of the video signal, so that noise can be reduced while preserving a fine structure. Furthermore, for a large fluctuation of the video signal, a filter coefficient is changed based on the pixel value difference, so that dulling of an edge part can be prevented.

According to the embodiment 2, since the recursive filter configuration used in the embodiment 1 described earlier is not used, a noise reduction effect comparable to the noise reduction effect provided by the embodiment 1 cannot be provided. However, the embodiment 2 provides another advantage that, even when a fine structure disappears in a frame because of erroneous detection of a motion vector or the like, the influence is eliminated in a short time (in a next frame, for example).

In the embodiments described above, the extraction block of the previous frame and the extraction block of the current frame have the same size. However, the present invention is not limited thereto. For example, the extraction block of the previous frame can be larger than the extraction block of the current frame. In this case, the motion vector over a wider range can be calculated. In addition, in this case, block matching of the motion vector can be performed for the entire extraction block of the current frame, so that the motion vector can be detected with higher precision.

In the embodiments described above, the configuration that performs the motion vector calculation processing, the filter coefficient calculation processing and the noise reduction processing substantially at the same time is designed to minimize the memory size of the frame memory (or frame memories). However, the present invention is not limited thereto, and the motion vector calculation processing can be separated from the other processings and performed preceding the other processings. However, in this case, an additional frame memory for motion vector calculation has to be provided.

The present invention is not limited to the embodiments described above, and various modifications can be made to the components of the present invention without departing from the spirit of the present invention. In addition, some of the components disclosed in the embodiments described above can be appropriately combined to provide various inventions. For example, some of the components shown in the embodiments can be omitted. Furthermore, components used in different embodiments can be appropriately combined. Thus, of course, various modifications or alterations can be made without departing the spirit of the present invention.

What is claimed is:

1. An image processing apparatus that performs a noise reduction processing on images inputted sequentially, the apparatus comprising:
a pixel extracting section which extracts a plurality of pixels in a first region including a target pixel in a target image and a plurality of pixels in a second region including a pixel located at a same spatial position as the target pixel in an image previous to the target image;
a motion vector calculating section which calculates a motion vector of the first region with respect to the previous image based on part or all of the pixels in the first region and part of the pixels in the second region;
a filter coefficient determining section which determines filter coefficients for the plurality of pixels in the second region based on the motion vector; and
a noise reducing section which reduces noise in the target pixel based on the plurality of pixels in the second region and the filter coefficients;
wherein the filter coefficient determining section includes:
a maximum weight position determining section which determines a maximum weight position pointed to by the motion vector with respect to the position of the target pixel as an initial point of the motion vector; and
a spatial distance weighting factor determining section which determines spatial distance weighting factors for at least the pixels in the second region based on spatial distances from the maximum weight position.

2. The image processing apparatus according to claim 1, further comprising:
a pixel value difference calculating section which calculates a difference value between a pixel value of a pixel in the first region extracted by the pixel extracting section and a pixel value of the target pixel and a difference value between a pixel value of a pixel in the second region extracted by the pixel extracting section and the pixel value of the target pixel,
wherein the motion vector calculating section calculates the motion vector of the first region with respect to the previous image based on the difference values for part or all of the pixels in the first region and the difference values for part of the pixels in the second region.

3. The image processing apparatus according to claim 2, wherein:
the filter coefficient determining section further determines filter coefficients for the plurality of pixels in the first region based on the difference values between the pixel values and the motion vector, and
the noise reducing section reduces noise in the target pixel based on the plurality of pixels in the first region, the plurality of pixels in the second region, and the filter coefficients.

4. The image processing apparatus according to claim 1, wherein the motion vector calculating section includes a noise quantity estimating section which estimates a noise quantity of the target pixel, and the motion vector calculating section determines the motion vector based on the estimated noise quantity.

5. The image processing apparatus according to claim 3, wherein the filter coefficient determining section further includes:
a pixel value distance weighting factor determining section which determines pixel value distance weighting factors for the pixels in the first and second regions based on the difference values between the pixel values; and
a filter coefficient calculating element which calculates filter coefficients for the pixels in the first and second regions based on the spatial distance weighting factors and the pixel value distance weighting factors.

6. The image processing apparatus according to claim 1, wherein the previous image is an image reduced in noise by the noise reducing section.

7. An image processing method that performs a noise reduction processing on images inputted sequentially, the method comprising:
extracting a plurality of pixels in a first region including a target pixel in a processing target image and a plurality of pixels in a second region including a pixel located at a same spatial position as the target pixel in an image previous to the processing target image;
calculating a motion vector of the first region with respect to the previous image based on part or all of the pixels in the first region and part of the pixels in the second region;
determining filter coefficients for the plurality of pixels in the second region based on the motion vector; and
reducing noise in the target pixel based on the plurality of pixels in the second region and the filter coefficients;
wherein determining the filter coefficients includes:
determining a maximum weight position pointed to by the motion vector with respect to the position of the target pixel as an initial point of the motion vector; and
determining spatial distance weighting factors for at least the pixels in the second region based on spatial distances from the maximum weight position.

8. The image processing method according to claim 7, further comprising:
calculating a difference value between a pixel value of a pixel in the first region and a pixel value of the target pixel and a difference value between a pixel value of a pixel in the second region and the pixel value of the target pixel,
wherein the motion vector of the first region with respect to the previous image is calculated based on the difference values for part or all of the pixels in the first region and the difference values for part of the pixels in the second region.

9. The image processing method according to claim 8, further comprising:
determining filter coefficients for the plurality of pixels in the first region based on the difference values between the pixel values and the motion vector,
wherein noise in the target pixel is reduced based on the plurality of pixels in the first region, the plurality of pixels in the second region, and the filter coefficients.

10. The image processing method according to claim 7, wherein calculating the motion vector comprises estimating a noise quantity of the target pixel, and determining the motion vector based on the estimated noise quantity.

11. The image processing method according to claim 9, wherein determining the filter coefficients further includes:
determining pixel value distance weighting factors for the pixels in the first and second regions based on the difference values between the pixel values; and
calculating filter coefficients for the pixels in the first and second regions based on the spatial distance weighting factors and the pixel value distance weighting factors.

12. The image processing method according to claim 7, wherein the previous image is an image reduced in noise.

* * * * *